United States Patent
McKeown et al.

(10) Patent No.: US 12,540,023 B2
(45) Date of Patent: Feb. 3, 2026

(54) BLANKS, CONSTRUCTS, AND ASSOCIATED METHODS FOR INDUCTION HEATING OF FOOD PRODUCTS

(71) Applicant: Graphic Packaging International, LLC, Atlanta, GA (US)

(72) Inventors: Murat Sean McKeown, Broomfield, CO (US); Raymond S. Kastanek, Mead, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 67 days.

(21) Appl. No.: 17/375,242

(22) Filed: Jul. 14, 2021

(65) Prior Publication Data

US 2022/0017285 A1     Jan. 20, 2022

Related U.S. Application Data

(60) Provisional application No. 63/052,037, filed on Jul. 15, 2020.

(51) Int. Cl.
*B32B 15/08*     (2006.01)
*B32B 3/30*     (2006.01)
(Continued)

(52) U.S. Cl.
CPC ............ *B65D 81/3476* (2013.01); *B32B 3/30* (2013.01); *B32B 15/08* (2013.01); *B32B 15/12* (2013.01);
(Continued)

(58) Field of Classification Search
CPC .............. B65D 5/22; B65D 2581/3468; B65D 81/3476; B65D 2581/344;
(Continued)

(56) References Cited

U.S. PATENT DOCUMENTS 3,865,301 A    2/1975   Pothier et al.
4,398,994 A    8/1983   Beckett
(Continued)

FOREIGN PATENT DOCUMENTS

CA     2196154     7/1998
EP     0 382 399     8/1990
(Continued)

OTHER PUBLICATIONS

International Search Report and Written Opinion for PCT/US2021/041528 dated Nov. 5, 2021.
(Continued)

*Primary Examiner* — Michael C. Romanowski
(74) *Attorney, Agent, or Firm* — Andrew N. Claerbout; FisherBroyles, LLC

(57) ABSTRACT

A construct includes at least one panel for supporting a food product, the at least one panel formed from a laminate structure having a base layer, a conductive layer, and a surface film. The construct further includes at least one spacing feature extending downwardly from the at least one panel for supporting the at least one panel a distance above an induction source for attenuating heat transferred to the food product in response to an oscillating magnetic field interacting with the conductive layer of the laminate structure.

24 Claims, 13 Drawing Sheets

(51) Int. Cl.
  *B32B 15/12* (2006.01)
  *B32B 15/20* (2006.01)
  *B32B 27/10* (2006.01)
  *B32B 29/00* (2006.01)
  *B65B 43/10* (2006.01)
  *B65D 5/20* (2006.01)
  *B65D 5/22* (2006.01)
  *B65D 81/34* (2006.01)

(52) U.S. Cl.
  CPC .............. *B32B 15/20* (2013.01); *B32B 27/10* (2013.01); *B32B 29/00* (2013.01); *B65B 43/10* (2013.01); *B65D 5/20* (2013.01); *B65D 5/2052* (2013.01); *B32B 2255/12* (2013.01); *B32B 2255/205* (2013.01); *B32B 2307/202* (2013.01); *B32B 2439/70* (2013.01); *B65D 5/22* (2013.01); *B65D 2581/3459* (2013.01); *B65D 2581/346* (2013.01); *B65D 2581/3468* (2013.01); *B65D 2581/3472* (2013.01); *B65D 2581/3494* (2013.01); *B65D 2581/3495* (2013.01); *B65D 2581/3497* (2013.01); *B65D 2581/3498* (2013.01)

(58) Field of Classification Search
  CPC .... B65D 2581/3441; B65D 2581/3456; B65D 2581/3459; B65D 2581/3462; B65D 1/225; B65D 2581/3494; B65D 5/20; B32B 3/30
  USPC ...................... 428/34.2, 34.1–36.92
  See application file for complete search history.

(56) References Cited

U.S. PATENT DOCUMENTS

| | | | | |
|---|---|---|---|---|
| 4,552,614 | A | 11/1985 | Beckett | |
| 4,641,005 | A * | 2/1987 | Seiferth | B65D 81/3446 426/243 |
| 4,656,325 | A | 4/1987 | Keefer | |
| 4,703,148 | A | 10/1987 | Mikulski | |
| 4,775,771 | A | 10/1988 | Pawlowski | |
| 4,780,587 | A * | 10/1988 | Brown | B65D 81/3461 426/243 |
| 4,785,160 | A * | 11/1988 | Hart | B65D 81/3453 426/243 |
| 4,794,005 | A | 12/1988 | Swiontek | |
| 4,826,072 | A * | 5/1989 | Hart | B65D 5/42 219/730 |
| 4,836,383 | A * | 6/1989 | Gordon | B65D 5/48014 219/730 |
| 4,836,439 | A * | 6/1989 | Hart | B65D 5/4295 229/160 |
| 4,865,921 | A | 9/1989 | Hollenberg | |
| 4,871,111 | A * | 10/1989 | Mode | B65D 5/2047 229/5.84 |
| 4,877,932 | A * | 10/1989 | Bernstein | B65D 81/3453 426/243 |
| 4,890,439 | A | 1/1990 | Smart | |
| 4,927,991 | A | 5/1990 | Wendt et al. | |
| 4,936,935 | A | 6/1990 | Beckett | |
| 4,963,424 | A | 10/1990 | Beckett | |
| 4,972,059 | A | 11/1990 | Wendt et al. | |
| 5,026,958 | A | 6/1991 | Palacios | |
| 5,039,364 | A | 8/1991 | Beckett | |
| 5,077,455 | A * | 12/1991 | Peleg | B65D 81/3453 219/730 |
| 5,117,078 | A | 5/1992 | Beckett | |
| 5,144,107 | A * | 9/1992 | Peleg | B65D 81/3453 426/243 |
| 5,153,402 | A * | 10/1992 | Quick | B65D 81/3453 219/730 |
| 5,213,902 | A | 5/1993 | Beckett | |
| 5,217,768 | A | 6/1993 | Walters et al. | |
| 5,221,419 | A | 6/1993 | Beckett | |
| 5,223,685 | A * | 6/1993 | DeRienzo, Jr. | H05B 6/6408 426/243 |
| 5,260,537 | A | 11/1993 | Beckett | |
| 5,266,386 | A | 11/1993 | Beckett | |
| 5,310,976 | A | 5/1994 | Beckett | |
| 5,310,977 | A | 5/1994 | Stenkamp et al. | |
| 5,317,118 | A | 5/1994 | Brandberg et al. | |
| RE34,683 | E | 8/1994 | Maynard | |
| 5,340,436 | A | 8/1994 | Beckett | |
| 5,350,904 | A | 9/1994 | Kemske et al. | |
| 5,354,973 | A | 10/1994 | Beckett | |
| 5,370,883 | A | 12/1994 | Saunier | |
| 5,410,135 | A | 4/1995 | Pollart | |
| 5,424,517 | A | 6/1995 | Habeger | |
| 5,446,270 | A | 8/1995 | Chamberlain et al. | |
| 5,519,195 | A | 5/1996 | Keefer | |
| 5,530,231 | A | 6/1996 | Walters et al. | |
| 5,585,027 | A | 12/1996 | Young | |
| 5,593,610 | A | 1/1997 | Minerich et al. | |
| 5,628,921 | A | 5/1997 | Beckett | |
| 5,672,407 | A | 9/1997 | Beckett | |
| 5,688,427 | A * | 11/1997 | Gallo, Jr. | B65D 81/3453 219/730 |
| 5,698,127 | A | 12/1997 | Lai et al. | |
| 5,759,422 | A | 6/1998 | Schmelzer | |
| 5,800,724 | A | 9/1998 | Habeger | |
| 5,928,555 | A | 7/1999 | Kim et al. | |
| 5,948,308 | A * | 9/1999 | Wischusen, III | B65D 5/2033 219/730 |
| 6,049,072 | A | 4/2000 | Olson et al. | |
| 6,102,281 | A | 8/2000 | Lafferty et al. | |
| 6,114,679 | A | 9/2000 | Lai et al. | |
| 6,150,646 | A | 11/2000 | Lai et al. | |
| 6,150,647 | A | 11/2000 | Anderson et al. | |
| 6,204,492 | B1 | 3/2001 | Zeng et al. | |
| 6,251,451 | B1 | 6/2001 | Zeng | |
| 6,359,272 | B1 * | 3/2002 | Sadek | H05B 6/6494 219/730 |
| 6,414,290 | B1 | 7/2002 | Cole | |
| 6,433,322 | B2 | 8/2002 | Zeng et al. | |
| 6,455,827 | B2 | 9/2002 | Zeng | |
| 6,552,315 | B2 | 4/2003 | Zeng et al. | |
| 6,677,563 | B2 | 1/2004 | Lai | |
| 6,717,121 | B2 | 4/2004 | Zeng et al. | |
| 6,765,182 | B2 | 7/2004 | Cole | |
| 6,919,547 | B2 | 7/2005 | Tsontzidis et al. | |
| 7,319,213 | B2 | 1/2008 | Tsontzidis et al. | |
| 7,476,830 | B2 | 1/2009 | Middleton et al. | |
| 8,124,200 | B2 | 2/2012 | Quella et al. | |
| 8,314,373 | B1 * | 11/2012 | Watkins | B65D 5/52 219/730 |
| 8,680,448 | B2 | 3/2014 | Wnek et al. | |
| 8,803,049 | B2 | 8/2014 | O'Hagan et al. | |
| 8,803,050 | B2 | 8/2014 | Lafferty et al. | |
| 8,901,469 | B2 | 12/2014 | Schneider et al. | |
| 9,174,789 | B2 | 11/2015 | Netzer et al. | |
| 9,451,659 | B2 | 9/2016 | Robbins | |
| 9,493,287 | B2 | 11/2016 | Lai et al. | |
| 9,656,776 | B2 | 5/2017 | Sloat et al. | |
| 9,701,103 | B2 | 7/2017 | Walsh et al. | |
| 9,751,288 | B2 | 9/2017 | Walsh | |
| 2003/0085223 | A1 | 5/2003 | Zeng et al. | |
| 2003/0085224 | A1 | 5/2003 | Tsontzidis et al. | |
| 2003/0111463 | A1 | 6/2003 | Lai | |
| 2004/0238535 | A1 * | 12/2004 | Mast | B65D 5/302 219/730 |
| 2006/0011620 | A1 | 1/2006 | Tsontzidis et al. | |
| 2006/0049190 | A1 | 3/2006 | Middleton | |
| 2007/0087090 | A1 * | 4/2007 | Russell | B65D 81/3453 426/113 |
| 2007/0215611 | A1 | 9/2007 | O'Hagan et al. | |
| 2007/0241102 | A1 * | 10/2007 | Carmichael | B65D 5/5445 219/730 |
| 2007/0262487 | A1 * | 11/2007 | O'Hagan | B65D 1/40 264/241 |

(56) References Cited

U.S. PATENT DOCUMENTS

| | | | |
|---|---|---|---|
| 2008/0081095 A1* | 4/2008 | Cole | F25D 23/065 219/730 |
| 2008/0099474 A1* | 5/2008 | Carmichael | B65D 81/3453 219/730 |
| 2009/0090708 A1* | 4/2009 | Requena | B65D 81/3453 219/730 |
| 2009/0200364 A1* | 8/2009 | Oliveira | B65D 5/5475 229/188 |
| 2009/0218338 A1* | 9/2009 | Futzwater | B65D 81/3453 219/730 |
| 2009/0223951 A1 | 9/2009 | Lai et al. | |
| 2009/0230126 A1* | 9/2009 | Fitzwater | B65D 81/3453 219/730 |
| 2009/0294439 A1 | 12/2009 | Lai et al. | |
| 2009/0314772 A1 | 12/2009 | Parysek | |
| 2010/0025393 A1* | 2/2010 | Talpaert | A47J 36/027 219/730 |
| 2010/0038359 A1* | 2/2010 | Laubhan | H05B 6/80 219/730 |
| 2010/0178396 A1* | 7/2010 | Lafferty | B65D 5/302 426/243 |
| 2012/0091126 A1 | 4/2012 | Fitzwater | |
| 2012/0312807 A1* | 12/2012 | Fitzwater | H05B 6/6408 219/730 |
| 2013/0256303 A1 | 10/2013 | Fitzwater | |
| 2020/0156819 A1* | 5/2020 | Ackroyd | B65D 5/0005 |

FOREIGN PATENT DOCUMENTS

| | | |
|---|---|---|
| JP | 3-505020 | 10/1991 |
| JP | 2005-211090 | 8/1993 |
| JP | 10-72068 | 3/1998 |
| JP | 2000-018595 | 1/2000 |
| JP | 2001-278362 | 10/2001 |
| JP | 2005-512902 | 5/2005 |
| JP | 2013-545513 | 12/2013 |
| KR | 10-0840926 B1 | 6/2008 |
| KR | 10-2016-0053860 A | 5/2016 |
| WO | WO 89/11772 | 11/1989 |
| WO | WO 91/11893 | 8/1991 |
| WO | WO 98/33724 | 8/1998 |
| WO | WO 98/35887 | 8/1998 |
| WO | WO 99/20116 A2 | 4/1999 |
| WO | WO 01/22778 | 3/2001 |
| WO | WO 03/041451 | 5/2003 |
| WO | WO 03/053106 | 6/2003 |
| WO | WO 2004/020310 | 3/2004 |
| WO | WO 2006/110685 | 10/2006 |
| WO | WO 2007/106353 | 9/2007 |
| WO | WO 2007/113545 | 10/2007 |
| WO | WO 2008/091760 | 7/2008 |
| WO | WO 2009/105398 | 8/2009 |
| WO | WO 2010/006098 | 1/2010 |
| WO | WO 2010/127214 | 11/2010 |
| WO | WO 2011/066254 | 6/2011 |
| WO | WO 2016/207826 A2 | 12/2016 |

OTHER PUBLICATIONS

Notice of Reasons for Refusal for Japanese Patent Application No. 2023-502761 dated Aug. 20, 2024, with English translation.
Supplementary European Search Report for European Application No. EP 21 84 2665 dated Jul. 26, 2024.

* cited by examiner

BLANKS, CONSTRUCTS, AND ASSOCIATED METHODS FOR INDUCTION HEATING OF FOOD PRODUCTS

CROSS-REFERENCE TO RELATED APPLICATION

This application claims the benefit of U.S. Provisional Patent Application No. 63/052,037, filed on Jul. 15, 2020.

INCORPORATION BY REFERENCE

The disclosure of U.S. Provisional Patent Application No. 63/052,037, filed on Jul. 15, 2020, is hereby incorporated by references for all purposes as if set forth in its entirety.

BACKGROUND OF THE DISCLOSURE

The present disclosure generally relates to laminate structures/blanks, constructs formed therefrom, and associated methods for heating one or more food products through induction heating. More specifically, the present disclosure relates to constructs having at least one spacing member for supporting a base panel at a predetermined vertical distance from an induction source.

SUMMARY OF THE DISCLOSURE

According to one aspect, the disclosure is generally directed to a construct, the construct comprising: at least one panel for supporting a food product, the at least one panel formed from a laminate structure comprising a base layer, a conductive layer, and a surface film. The construct further comprises at least one spacing feature extending downwardly from the at least one panel for supporting the at least one panel a distance above an induction source for attenuating heat transferred to the food product in response to an oscillating magnetic field interacting with the conductive layer of the laminate structure.

According to another aspect, the disclosure is generally directed to a blank for forming a construct, the blank comprising at least one panel for supporting a food product, the at least one panel formed from a laminate structure comprising a base layer, a conductive layer, and a surface film. The blank further comprises features for forming at least one spacing feature extending downwardly from the at least one panel for supporting the at least one panel a distance above an induction source for attenuating heat transferred to the food product in response to an oscillating magnetic field interacting with the conductive layer of the laminate structure when the construct is formed from the blank.

According to another aspect, the disclosure is generally directed to a method of forming a construct, the method comprising obtaining a blank comprising at least one panel formed from a laminate structure comprising a base layer, a conductive layer, and a surface film. The method further comprises forming at least one spacing feature extending downwardly from the at least one panel to support the at least one panel a preselected distance above an induction source for attenuating heat transferred to a food product in response to an oscillating magnetic field interacting with the conductive layer of the laminate structure.

According to another aspect, the disclosure is generally directed to a method of heating a food product, the method comprising obtaining a blank comprising at least one panel formed from a laminate structure comprising a base layer, a conductive layer, and a surface film, and forming a construct from the blank such that the construct comprises the at least one panel and at least one spacing feature extending downwardly from the at least one panel. The method further comprises positioning the construct on an induction source with the at least one spacing feature supporting the at least one panel a distance above the induction source, and activating the induction source to produce an oscillating magnetic field interacting with the conductive layer of the laminate structure to heat at least one food product supported on the at least one panel.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

Various aspects of the disclosure may be understood further by referring to the figures. For purposes of simplicity, like numerals may be used to describe like features. It will be understood that where a plurality of similar features are depicted, not all of such features necessarily are labeled on each figure. It also will be understood that the various components used to form the constructs may be interchanged. Thus, while only certain combinations are illustrated herein, numerous other combinations and configurations are contemplated hereby.

Constructs according to the present disclosure can accommodate articles of numerous different shapes. For the purpose of illustration and not for the purpose of limiting the scope of the disclosure, the following detailed description describes articles such as food products at least partially disposed upon or within the construct embodiments.

The articles can include, but are not limited to, fast food products, take-out products, meal leftovers, and the like, or any combination thereof. Examples of such products include, pastries (e.g., filled or frosted pastries), breads, fruit bars, French toast sticks, fish, chicken (such as chicken nuggets, chicken strips, chicken fingers, etc.), popcorn, peanuts, candy, French fries (such as waffle fries, steak fries, shoestring fries, curly fries, etc.), sandwiches, pizza, calzone, turnover, burrito, or any other food product that may be provided for consumption by a consumer. In this specification, the terms "inner," "interior," "outer," "exterior," "lower," "bottom," "upper," and "top" indicate orientations determined in relation to fully erected and upright constructs.

As described herein, constructs may be formed by multiple overlapping panels, end flaps, and/or other portions of blanks. Such panels, end flaps, and/or other portions of the blanks can be designated in relative terms to one another, e.g., "first", "second", "third", etc., in sequential or non-sequential reference, without departing from the disclosure.

Figure 1:
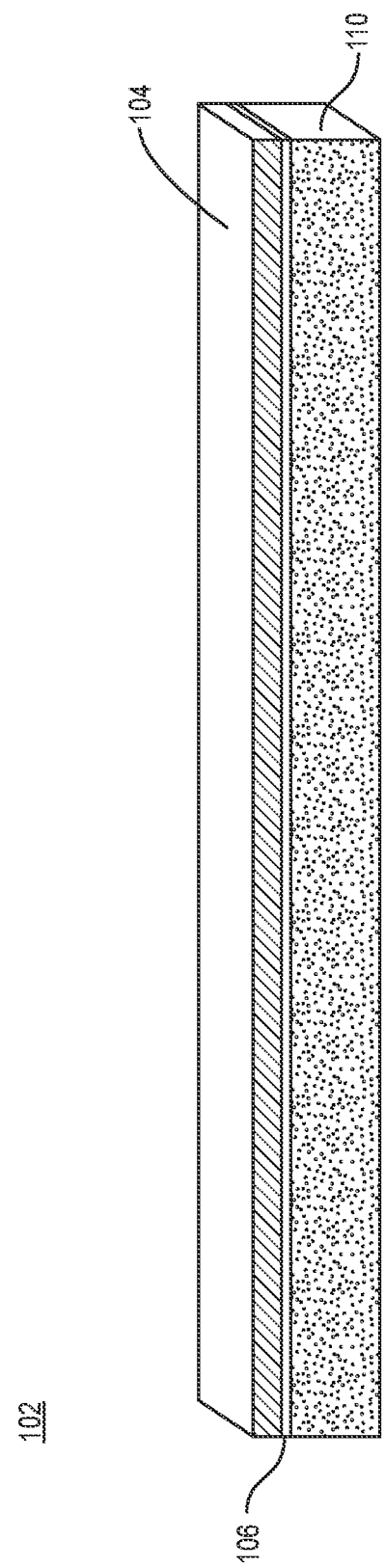
FIG. 1 is a cross-sectional view of a laminate structure for use in forming blanks and constructs according to the present disclosure.

Referring to FIG. 1, a schematic cross-sectional view of a laminate structure 102 for forming a blank 103 and/or a construct 100 (FIG. 4) is illustrated according to an exemplary embodiment of the disclosure. The construct 100 can be used to support or hold one or more food products, and can include one or more electrically and/or thermally conductive materials so that the construct 100 can generate heat upon exposure to changing/oscillating magnetic fields, e.g., such that Eddy currents are induced in the electrically conductive materials and such that electrical resistance to such Eddy currents produces heat. In this regard, the laminate structure 102, blank 103, and/or construct 100 are configured for use with an induction generator or induction source, e.g., a source of changing/oscillating magnetic fields, to provide induction heating to one or more food products. In the case of ferromagnetic conductive materials, heating can be at least partially provided by hysteresis losses.

As shown, the laminate structure 102 includes a food-contacting or surface film 104, a conductive material or conductive layer 106, and a base layer of material 110. In this regard, the food-contacting film 104 forms an interior or food-supporting surface of the laminate structure 102. The food-contacting film 104 can be formed of, for example, a polymeric material such as polyethylene terephthalate (PET). The food-contacting film 104 can provide barrier properties for at least the base layer 110, for example, resistance to the passage of fluids such as moisture, oil, and/or food runoff, and can be suitable for use in heating applications as described herein. The food-contacting film 104 can be formed of additional or alternative materials, for example, metallic or composite materials, without departing from the disclosure.

The conductive layer 106, as shown and described, may be at least partially formed of material that is electrically and/or thermally conductive or semiconductive, for example, a metal or a metal alloy (e.g., a ferrous/magnetic/paramagnetic metal), or another material that can have suitable properties for induction heating. Such materials can include, for example, copper and copper alloys, brass, aluminum, iron, steel, stainless steel, tungsten, chrome, nickel, cobalt, carbon fiber, graphite, silicum, platinum, silver, gold, alloys thereof, etc. In the exemplary embodiment shown, the conductive layer 106 can be formed from aluminum, through additional or alternative metallic materials can be used without departing from the disclosure. The conductive layer 106 can be patterned or configured, for example, to include one or more discontinuities and/or nonconductive regions to provide a desired profile for electrical and/or thermal conduction, without departing from the disclosure.

The base layer 110 can be a composite material, such as a paper or paper-based product (e.g., paperboard, etc.) and supports the conductive layer 106 and the food-contacting film 104, and is generally configured to be the same size, shape, and/or dimensions as one or more of those components, though the base layer 110 can be differently-configured without departing from the disclosure.

The laminate structure 102 can be formed by arranging the food-contacting film 104, the conductive layer 106, and the base layer 110 in respective overlapping relation. Such an arrangement can be provided through lamination processes that include, for example, rollers and nips, chemical deposition, the application of one or more adhesives, etc.

It will be understood that the food-contacting film 104 and the conductive layer 106 can be separately-formed elements, the food-contacting film 104 can be metallized or otherwise provided with a conductive material, and/or the conductive layer 106 can be provided with a coating or surface treatment that performs similarly to the food-contacting film 104. In one embodiment, the conductive layer 106 can be provided without an accompanying film or film-like treatment.

In one embodiment, the laminate structure 102 can include a food-contacting layer 104 formed from 75ga PET, a conductive layer 106 formed from aluminum at a thickness of about 7 microns, and a base layer 110 formed from paperboard having a thickness of about .018 caliper. It will be understood that the laminate structure 102, or one or more components thereof, can have a different configuration without departing from the disclosure.

Figure 2:
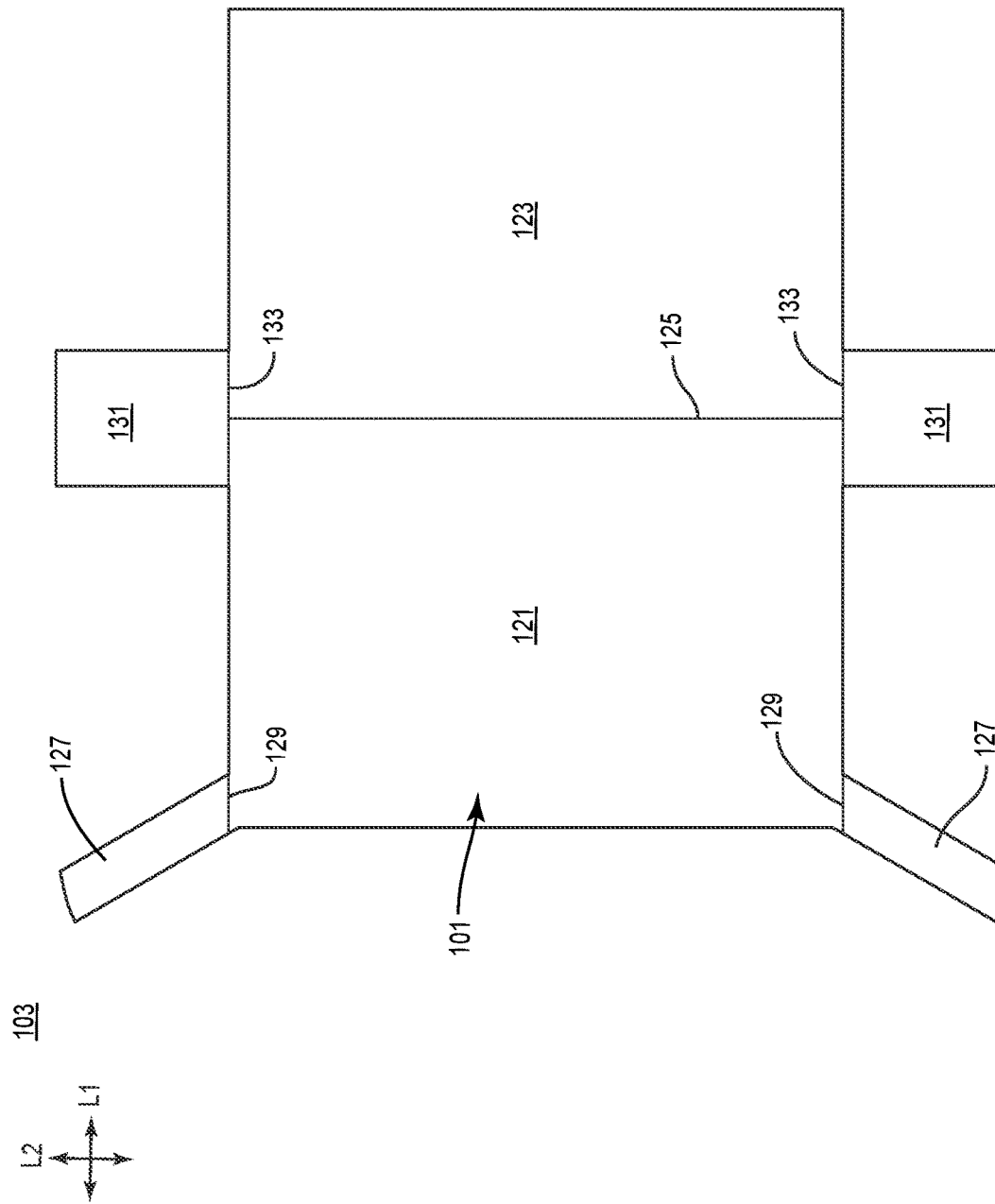
FIG. 2 is a plan schematic view of a blank for forming a construct according to a first exemplary embodiment of the disclosure.

Referring additionally to FIG. 2, an exterior surface 101 of a blank 103 for forming the construct 100 is illustrated according to a first exemplary embodiment of the disclosure. The blank 103 can be formed from the laminate structure 102, though it will be understood that a different material arrangement can be provided to form the blank 103.

As shown, the blank 103 can have a longitudinal axis L1, a lateral axis L2, and one or more panels. In the illustrated embodiment, the blank 103 can include a center panel or bottom panel or main panel or base panel 121 (broadly, "first base panel" or "second base panel") separably and/or foldably connected to a center panel or bottom panel or main panel or base panel 123 (broadly, "first base panel" or "second base panel") at a lateral line of weakening 125.

The blank 103 can include a plurality of end flaps or flaps foldably/separably connected to a respective panel, and, as shown, can include a pair of positioning flaps 127 separably and/or foldably connected to opposite longitudinal free edges of the base panel 121 at respective longitudinal lines of weakening 129.

A pair of positioning flaps 131, as shown, can also be foldably and/or separably connected to portions of opposite respective longitudinal free edges of the base panels 121, 123 at respective longitudinal lines of weakening 133 that intersect the line of weakening 125. As described further herein, one or more of the positioning flaps 127, 131 can engage a portion of a forming tool or apparatus, or can otherwise be engaged to position the base panels 121, 123 relative to a forming tool or apparatus.

Figure 3:
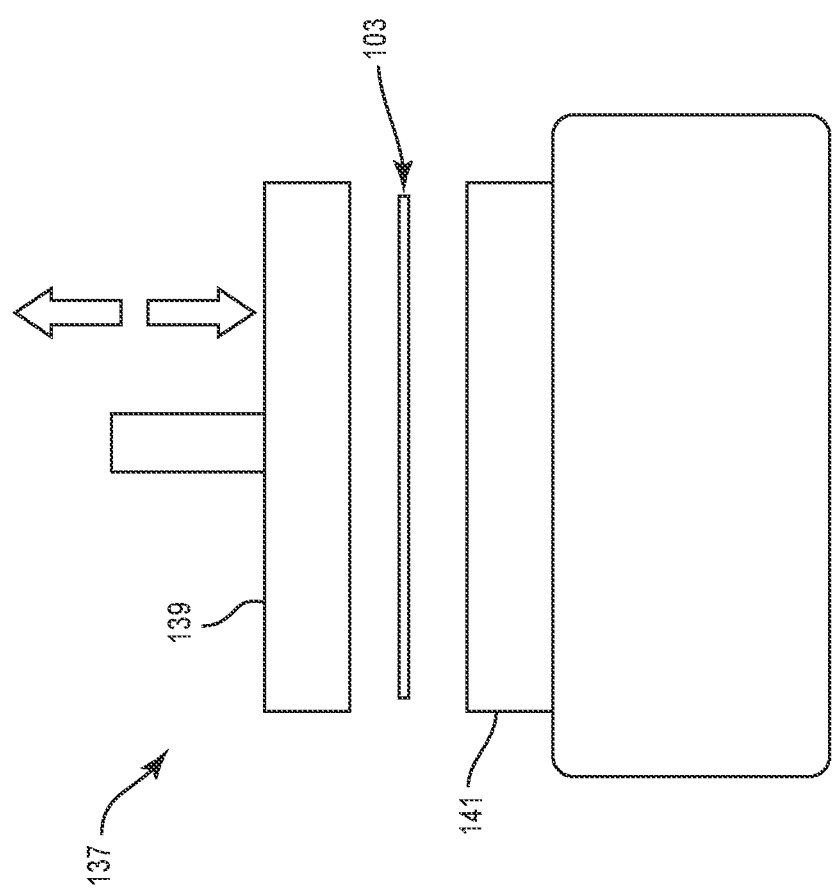
FIG. 3 is a schematic view of the blank of FIG. 2 positioned in a forming apparatus.

Turning to FIG. 3, a schematic representation of a forming apparatus 137 for reconfiguring the blank 103 into a construct 100 is illustrated. As shown, the forming apparatus 137 can include a male forming member 139, e.g., an anvil or other member having one or more protruding surface features, and a female forming member 141, e.g., a mold/cavity of other member having one or more recessed surface features complementary to the surface features of the male forming member 141.

In the illustrated embodiment, the male forming member 139 and the female forming member 141 can be arranged so as to be movable relative to one another, e.g., such that one or both of the male forming member 139 and the female forming member 141 can be configured to move toward and/or away from the other of the male forming member 139 and the female forming member 141.

In this regard, the blank 103 can be positioned between the male forming member 139 and the female forming member 141 of the forming apparatus 137, and such position can be achieved and/or maintained via engagement of one or more of the positioning flaps 127, 131 with a portion of the forming apparatus 137, e.g., a rim or margin of one or both of the forming members 139, 141, a clamp, clip, or other retaining structure, etc. In one embodiment, a retaining structure can be mounted on or positioned near the forming apparatus 137 and can engage one or more of the positioning flaps 127, 131 to maintain the position of the blank 103 during operation of the forming apparatus 137.

One or more of the forming members 139, 141 can be drawn together/approximated toward one another such that one or more of the protruding surface features of the male forming member 139 urges a portion of the blank 103 into the corresponding recessed feature of the female forming member 141. Such action of the forming apparatus 137 can cause at least partial deformation/and or reconfiguration of the blank 103 into the construct 100, including forming at least one spacing feature of the construct 100, as described further herein.

Figure 4:
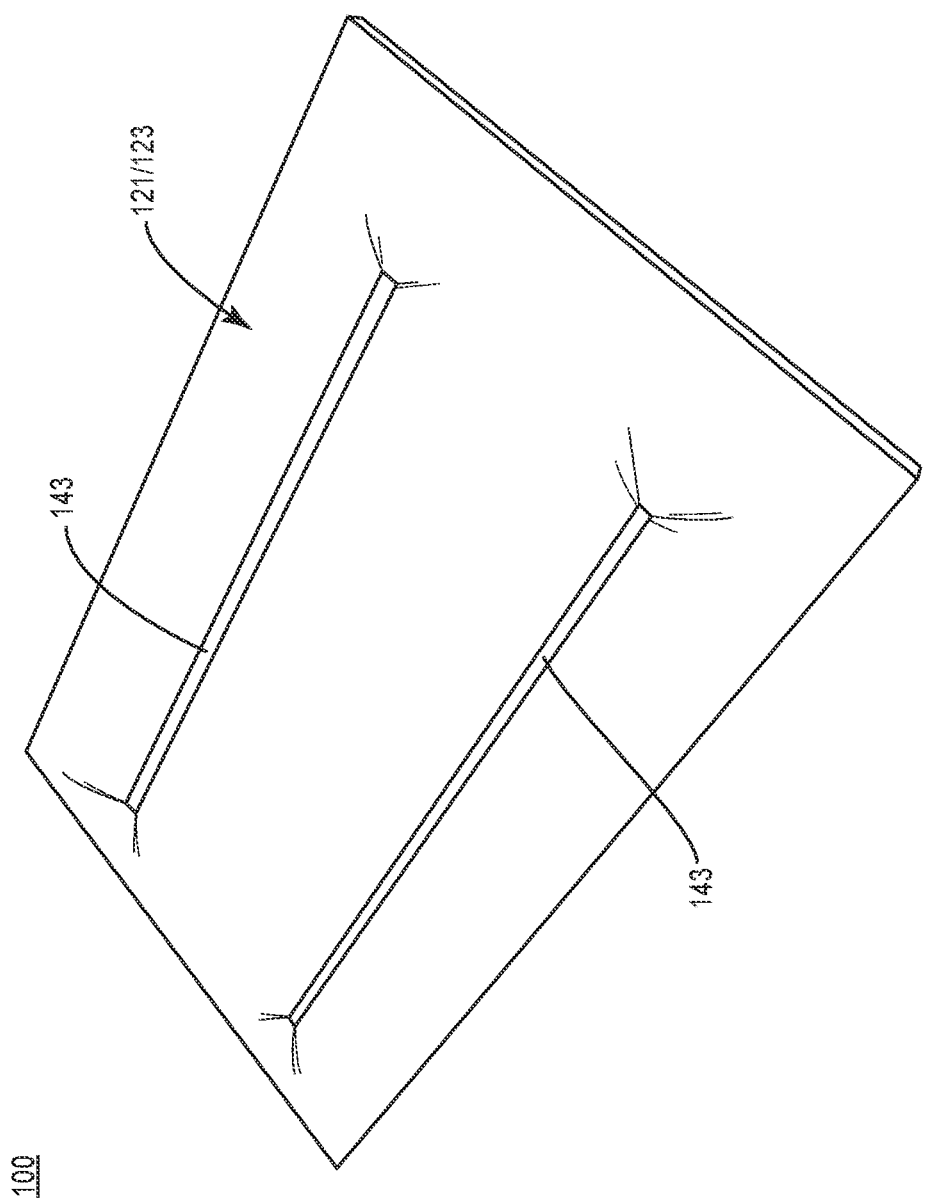
FIG. 4 is a perspective view of a construct formed from the blank of FIG. 2 according to the first exemplary embodiment.
Figure 5:
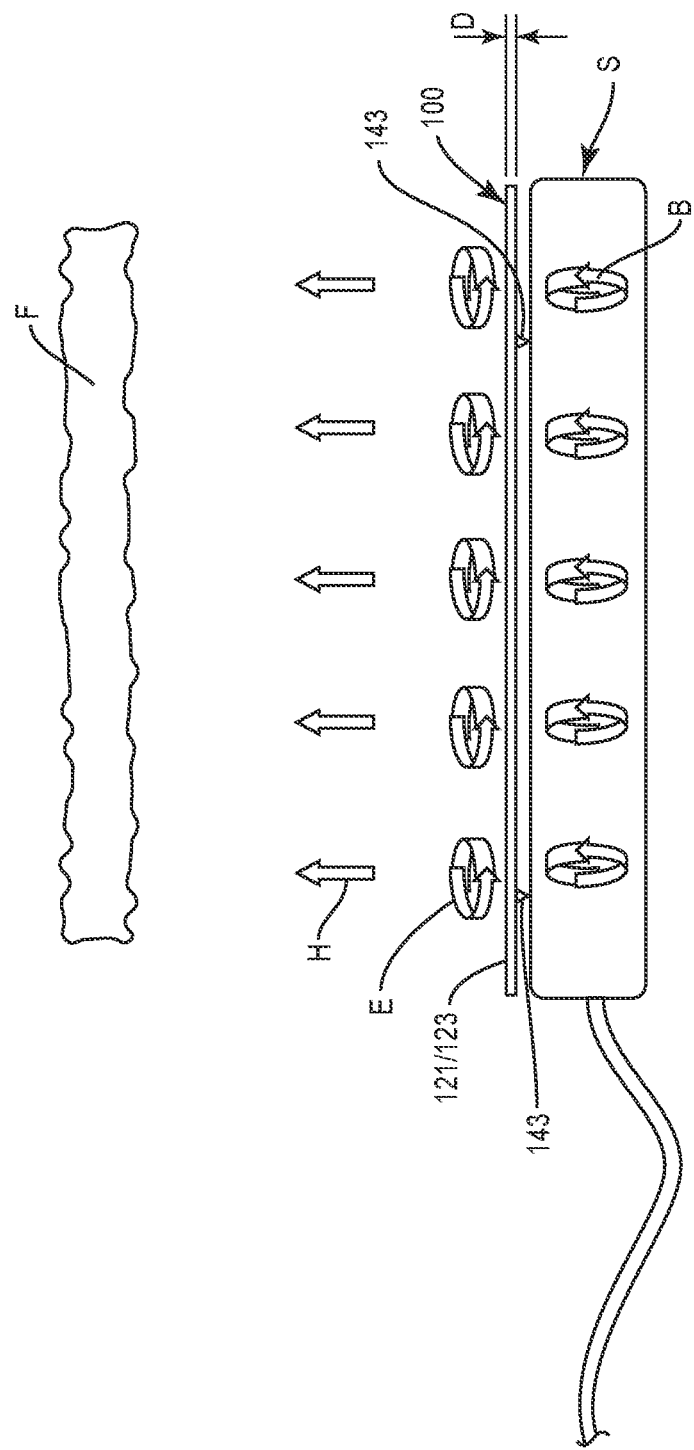
FIG. 5 is a schematic view of the construct of FIG. 4 positioned on an induction source for induction heating.

Referring additionally to FIGS. 4 and 5, the construct 100 formed from the blank 103 is illustrated according to the first exemplary embodiment of the disclosure. As shown, the construct 100 can include at least one of the base panels 121, 123. Accordingly, one or more of the positioning flaps 127, 131, and/or another of the base panels 121, 123 can be separated from one of the base panels 121, 123 at a respective line of weakening 129, 133, 125. It will be understood that the construct 100 can include both of the base panels 121, 123 and/or one or more of the positioning flaps 127, 131 without departing from the disclosure. For example, in one embodiment, the base panels 121, 123 can be folded into at least partial face-to-face contact at the line of weakening 125 such that the construct 100 is formed from the panel 121, 123 arranged in a two-ply construction. Alternatively, the base panels 121, 123 can be positioned to be spaced apart from one another in the formed construct, or the base panels can be alternatively arranged such as to form separate constructs or trays.

As shown, the construct 100 can include spacing features that can include a pair of spacing members 143 protruding downwardly from the base panel 121/123. The spacing members 143 can be formed via action of the forming apparatus 137 described above. For example, the spacing members 143 can be at least partially formed via reconfiguration of the at least the conductive layer of the material that forms the blank 103/construct 100, e.g., a malleable metallic material of the conductive layer 106 (FIG. 1) that undergoes an at least partial change in shape during operation of the forming apparatus 137.

As shown, the spacing members 143 can have the form of generally elongate oblique or wedge-shaped protrusions extending downwardly from the base panel 121/123. In one embodiment, the spacing members 143 can have the form of an elongate crease or pleat corresponding to respective indentations 142 in the upper surface of the base panel 121/123. It will be understood that the spacing members 143 can have a different configuration, e.g., curves, bumps, peaks, etc., and can be continuous features or have one or more discontinuities, without departing from the disclosure.

The construct 100 is shown in FIG. 5 supported on an induction source S that is configured to generate one or more oscillating/changing magnetic fields B. In this regard, the induction source S can include a working coil, e.g., a wound/helical configuration of metal wire or cable and can include or be electrically coupled to a power source and activated/energized to provide alternating electrical current to the working coil. In one embodiment, the induction source can be an induction cooktop, e.g., a glass/ceramic/composite surface below which is positioned copper or other magnetic coil(s) to generate magnetic fields for induction cooking.

Upon generation of one or more oscillating magnetic fields B by the induction source S, one or more electrical currents E, e.g., Eddy currents, can form in the conductive material of the construct 100. The electrical resistance of the conductive material of the construct 100 to such electrical currents generates heat H that can be conducted to a food product, for example, a food product F.

As shown, the spacing members 143 of the construct 100 position/support the base panel 121/123 (and the food product thereon) a predetermined or preselected distance D above the induction source S. Such distance D of the base panel 121/123 above the induction source S can provide a desired attenuation of the heat H provided to food product F in response to the oscillating magnetic field B, for example, to prevent thermal damage (e.g., crazing, flaking, etc.) of one or more portions of the construct 100, to prevent charring or overcooking of the food product F, etc., that may occur at distances less than D above the induction source S. In one embodiment, the distance D can be about 1.75 mm. Alternatively, the distance D can be more or less than 1.75 mm without departing from the scope of the disclosure. For example, the distance D can be selected based on the various parameters of the induction source (e.g., size of an induction cooktop, power of the induction cooktop, etc.).

Figure 6:
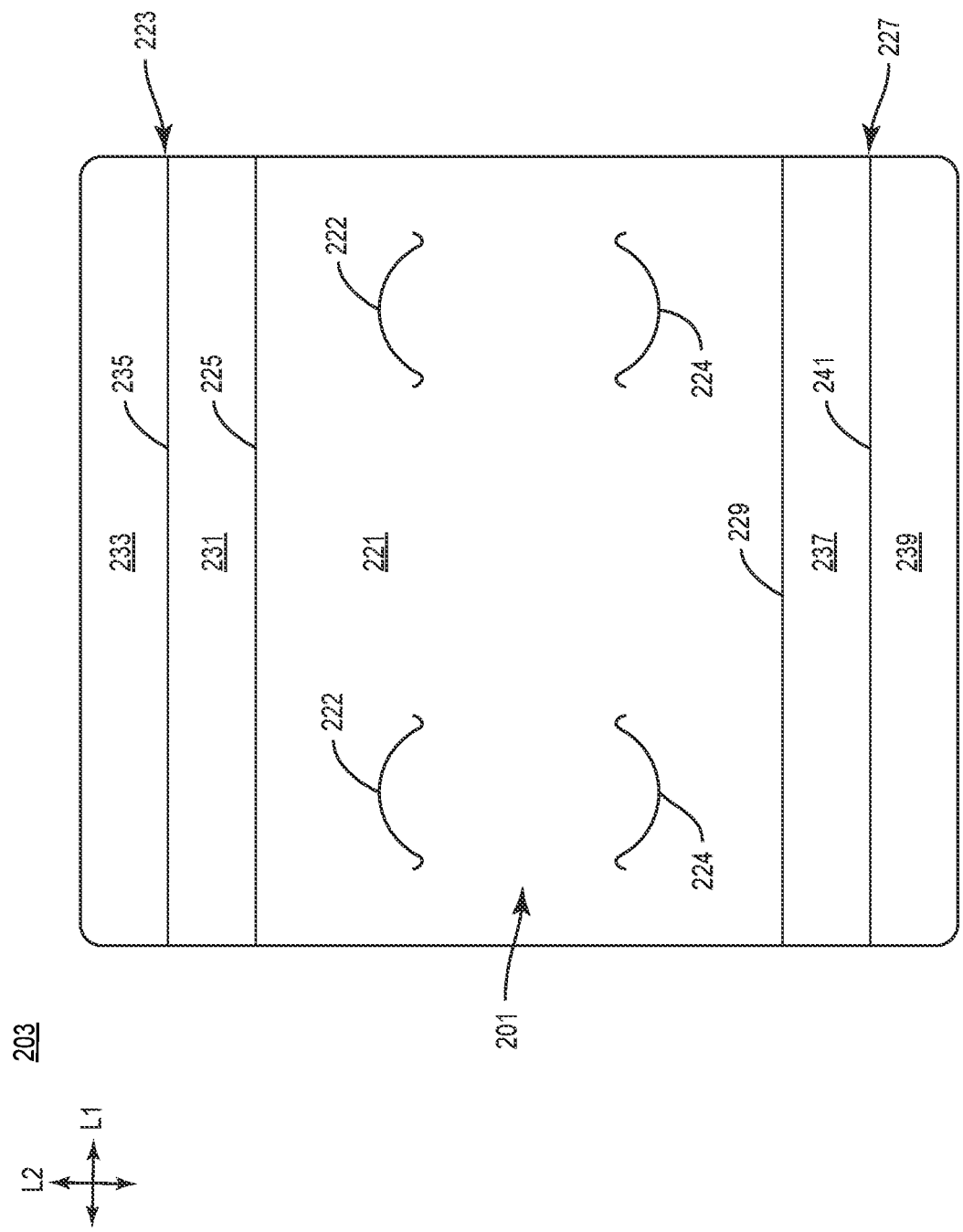
FIG. 6 is a plan schematic view of a blank for forming a construct according to a second exemplary embodiment of the disclosure.

Referring additionally to FIG. 6, an exterior surface 201 of a blank 203 for forming a construct 200 (FIG. 7) according to a second exemplary embodiment of the disclosure is illustrated. The blank 203 and the construct 200 can have one or more features that are the same or similar to those described above with regard to the blank 103 and the construct 100, and like or similar reference numbers are used to denote like or similar features.

The blank 203 has the longitudinal axis L1 and the lateral axis L2 and can be at least partially formed from the laminate structure 102, though the blank 203 can be formed from one or more additional or alternative materials without departing from the disclosure.

As shown, the blank 203 includes a main panel or central panel or base panel 221 having a pair of longitudinally spaced convex cuts 222 (e.g., cuts having a radius of curvature extending laterally upwardly from a longitudinal centerline of the blank 203) opposite a pair of longitudinally spaced concave cuts 224 (e.g., cuts having a radius of curvature extending laterally downwardly from a longitudinal centerline of the blank 203).

The blank also includes a first end flap 223 foldably connected to the base panel 221 at a longitudinal fold line 225, and a second end flap 227 foldably connected to the base panel 221 at a longitudinal fold line 229.

The end flap 223, as shown, includes a proximal portion 231 foldably connected to the base panel 221 at the longitudinal fold line 225, and a distal portion 233 foldably connected to the proximal portion 231 at a longitudinal fold line 235.

Similarly, the end flap 227 includes a proximal portion 237 foldably connected to the base panel 221 at the longitudinal fold line 229, and a distal portion 239 foldably connected to the proximal portion 237 at a longitudinal fold line 241.

Figure 7:
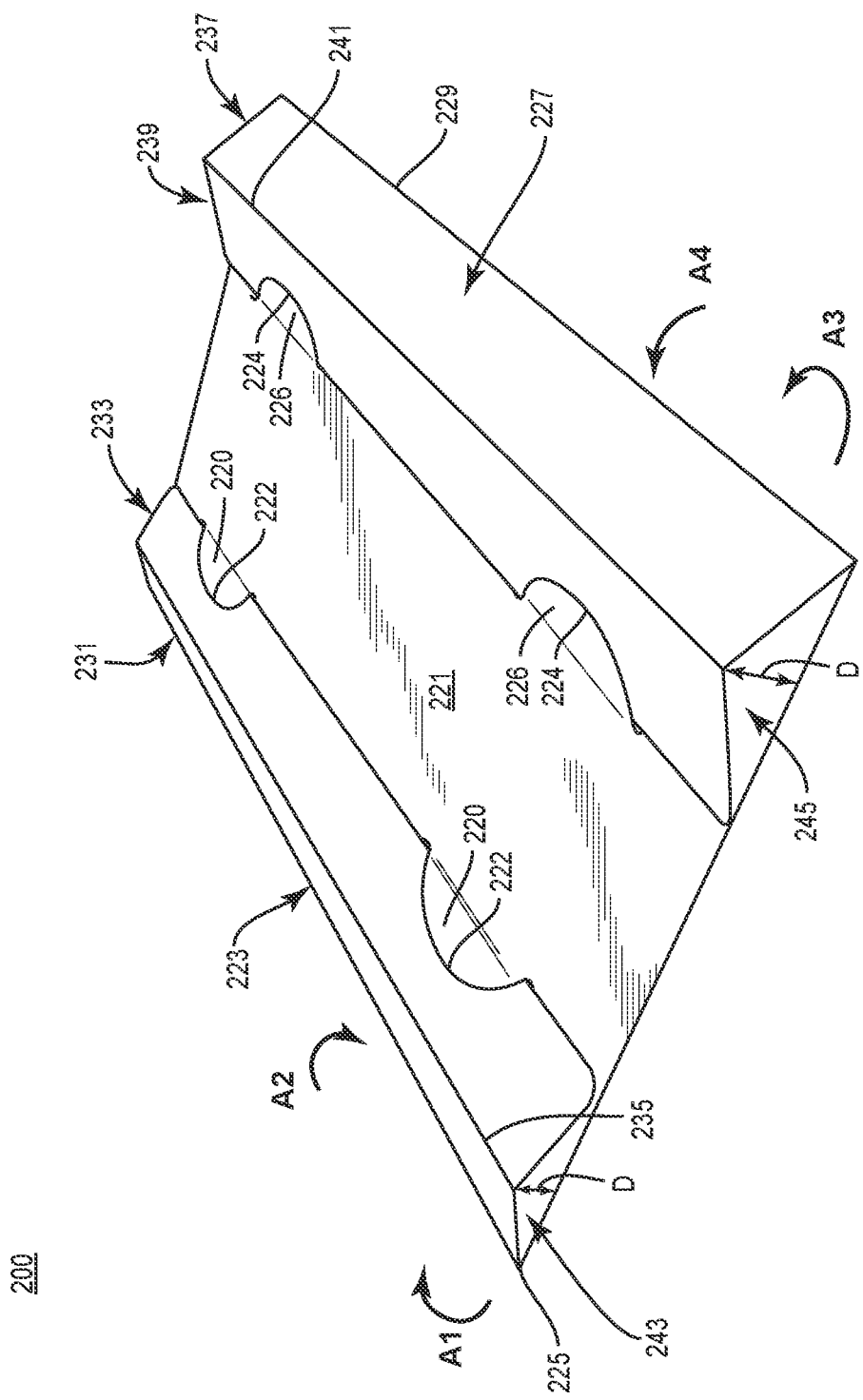
FIG. 7 is a perspective view of a construct formed from the blank of FIG. 6 according to the second exemplary embodiment.

With additional reference to FIG. 7, the construct 200 can be formed from the blank 203, in one exemplary embodiment, by placing the exterior surface 201 of the blank 203 facing downwardly on a supporting surface and folding the proximal portion 231 of the end flap 223 at the fold line 225 in the direction of the arrow A1 and folding the distal portion 233 of the end flap 223 at the fold line 235 in the direction of the arrow A2 to insert respective portions of the distal portion 233 of the end flap 223 through openings in the base panel 221 formed by the respective cuts 222.

In this regard, a spacing member 243 can be formed by the arrangement of the proximal portion 231 and the distal portion 233 of the end flap 223 and positioned extending downwardly from the base panel 221. The spacing member 243 can have a generally oblique or wedge-shaped profile formed by the arrangement of the proximal portion 231 and the distal portion 233 of the end flap 223, though the spacing member 243 can have a different arrangement without departing from the disclosure. In the aforementioned arrangement, the proximal portion 231 of the end flap 223 extends from the base panel 221 to the distal portion 233 of the end flap 223, and the distal portion 233 of the end flap 223 extends from the proximal portion 231 of the end flap 223 to the base panel 221.

Similarly, the proximal portion 237 of the end flap 227 can be folded at the fold line 229 in the direction of the arrow A3 and the distal portion 239 of the end flap 227 can be folded at the fold line 241 in the direction of the arrow A4. Portions of the distal portion 239 of the end flap 227 can be inserted into openings formed by the respective cuts 224 to form a spacing member 245 extending downwardly from the base panel 221 and having a generally oblique or wedge-shaped profile formed by the arrangement of the proximal portion 237 and the distal portion 239 of the end flap 227. In the aforementioned arrangement, the proximal portion 237 of the end flap 227 extends from the base panel 221 to the distal portion 239 of the end flap 227, and the distal portion 239 of the end flap 227 extends from the proximal portion 237 of the end flap 227 to the base panel 221. The spacing member 245 can have a different arrangement without departing from the disclosure.

In the foregoing arrangement, portions of the base panel 221 can at least partially separate away from the remainder thereof at the cuts 222, 224 to form respective retention tabs 220, 226 for retaining the respective end flaps 223, 227.

In this regard, the spacing members 243, 245 of the construct 200 position the base panel 221 the preselected distance D above an induction source, e.g., the induction source S illustrated in FIG. 5, to provide a desired attenuation of the heat H provided to food product F in response to the oscillating magnetic field B, for example, to prevent thermal damage (e.g., crazing, flaking, etc.) of one or more portions of the construct 200, to prevent charring or overcooking of the food product F, etc., as described above with regard to the construct 100.

Figure 8:
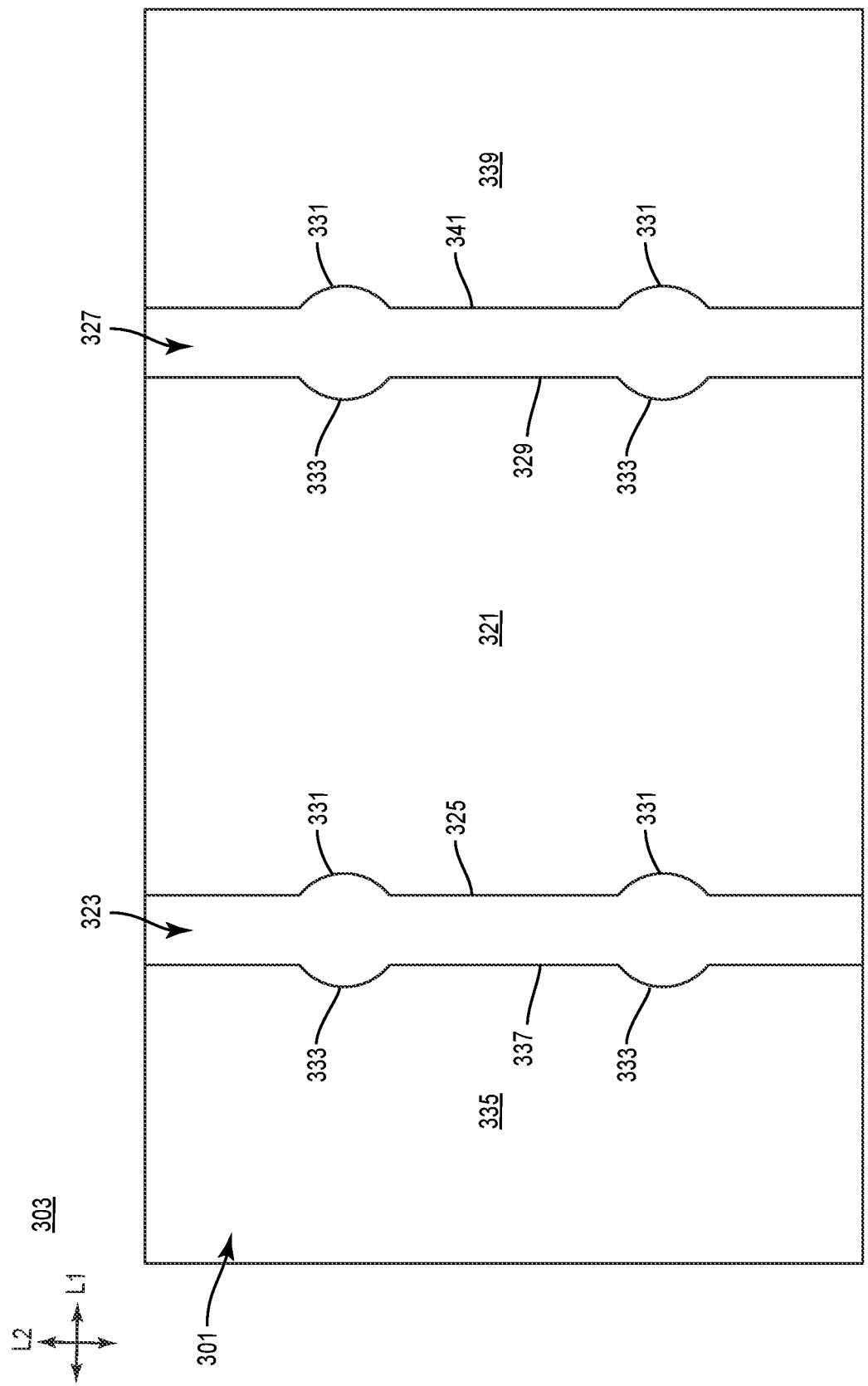
FIG. 8 is a plan schematic view of a blank for forming a construct according to a third exemplary embodiment of the disclosure.

Referring additionally to FIG. 8, an exterior surface 301 of a blank 303 for forming a construct 300 (FIG. 9) according to a third exemplary embodiment of the disclosure is illustrated. The blank 303 and the construct 300 can have one or more features that are the same or similar to those described above with regard to the blanks 103, 203 and the constructs 100, 200, and like or similar reference numbers are used to denote like or similar features.

The blank 303 has the longitudinal axis L1 and the lateral axis L2 and can be at least partially formed from the laminate structure 102, though the blank 303 can be formed from one or more additional or alternative materials without departing from the disclosure.

As shown, the blank 303 includes a main/central/bottom panel or base panel 321 foldably connected to a first side panel 323 at a lateral fold line 325 and foldably connected to a second side panel 327 at a lateral fold line 329. Each fold line 325, 329 can be interrupted by a respective pair of laterally spaced curved cuts 331, 333.

The first side panel 323 can be foldably connected to a first top panel 335 at a lateral fold line 335 that is interrupted by a respect pair of the curved cuts 333. Similarly, the second side panel 327 can be foldably connected to a second top panel 339 at a lateral fold line 341 that is interrupted by a pair of the curved cuts 331 such that the cuts 331, 333 are arranged in opposed concave/convex relation. In one embodiment, a different arrangement of top panels, e.g., a single top panel, can be provided.

Figure 9:
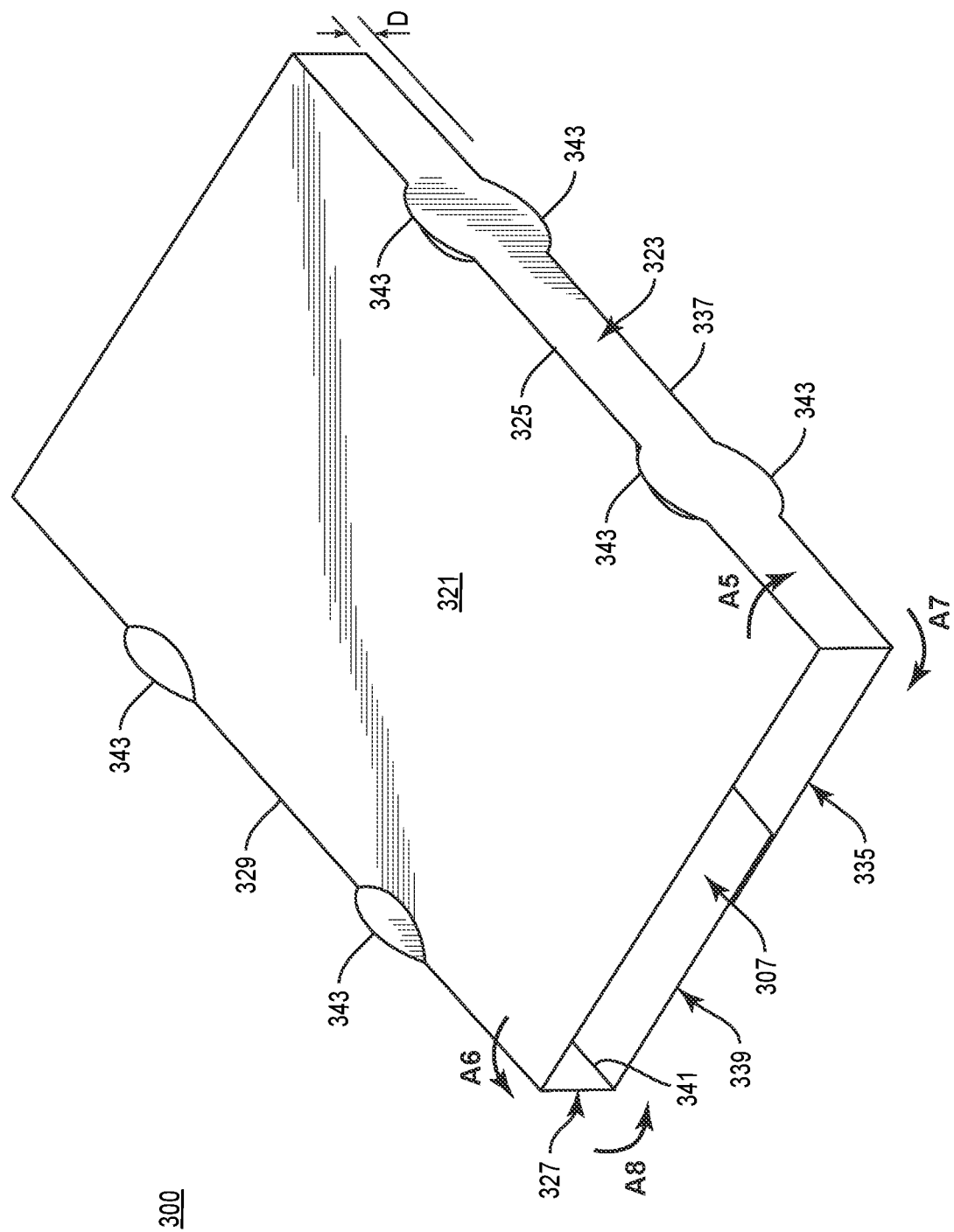
FIG. 9 is a perspective view of a construct formed from the blank of FIG. 8 according to the third exemplary embodiment of the disclosure.

With additional reference to FIGS. 9, the construct 300 can be formed from the blank 303, in one exemplary embodiment, by placing the exterior surface 301 of the blank 303 facing downwardly on a supporting surface and folding the side panels 323, 327 upwardly at the respective fold lines 325, 329 in the direction of the respective arrows A5 and A6. Thereafter, the top panels 335, 339 can be folded at the respective fold lines 337, 341 toward each other in the direction of the respective arrows A7, A8 such that top panels 335, 339 are positioned in an at least partially overlapping arrangement, e.g., at least partial face-to-face contact with one another. Such an arrangement of the construct 300 can be maintained with an adhesive such as glue G.

Upon such formation of the construct 300, portions of the respective side panels 323, 327 can separate from the respective adjacent panels at the respective cuts 331, 333 to form a plurality of spacing members 343 (broadly, "first spacing members") protruding from opposed edges of the side panels 323, 327. As shown, a set of four spacing members 343 can protrude upwardly relative to the top panels 339, 335 and a set of four spacing members 343 can protrude downwardly relative to the base panel 321. It will be understood that one or more of the spacing members 343 can have a different configuration or arrangement without departing from the disclosure.

In this regard, the panels 321, 323, 327, 335, 339 extend at least partially around an interior 307 of the construct 300 in an open-sleeve like arrangement within which a food product can be at least partially received. While the top panels 335, 339 have been described as the uppermost panels/layers of the construct 300, it will be understood that the construct 300 can be inverted such that the panels 335, 339 are the lowermost or supporting panels/layers of the construct 300, and the panel 321 is positioned as the uppermost panel/layer of the construct 300.

The construct 300 is shown supported on an induction source, such as the induction source S illustrated in FIG. 5, that is configured to generate one or more oscillating/changing magnetic fields B such that, upon generation of one or more oscillating magnetic fields B by the induction source S, one or more electrical currents, e.g., Eddy currents, can form in the conductive material of the construct 300 to generate heat H through electrical resistance that can be conducted to a food product, for example, a food product F.

The spacing members 343 of the construct 300 can thus be configured to position the base panel 321 a preselected distance D above the induction source S to provide a desired attenuation of the heat H provided to food product F in response to the oscillating magnetic field B, for example, to prevent thermal damage (e.g., crazing, flaking, etc.) of one or more portions of the construct 300, to prevent charring or overcooking of the food product F, etc., as described above with regard to the constructs 100, 200.

Figure 10:
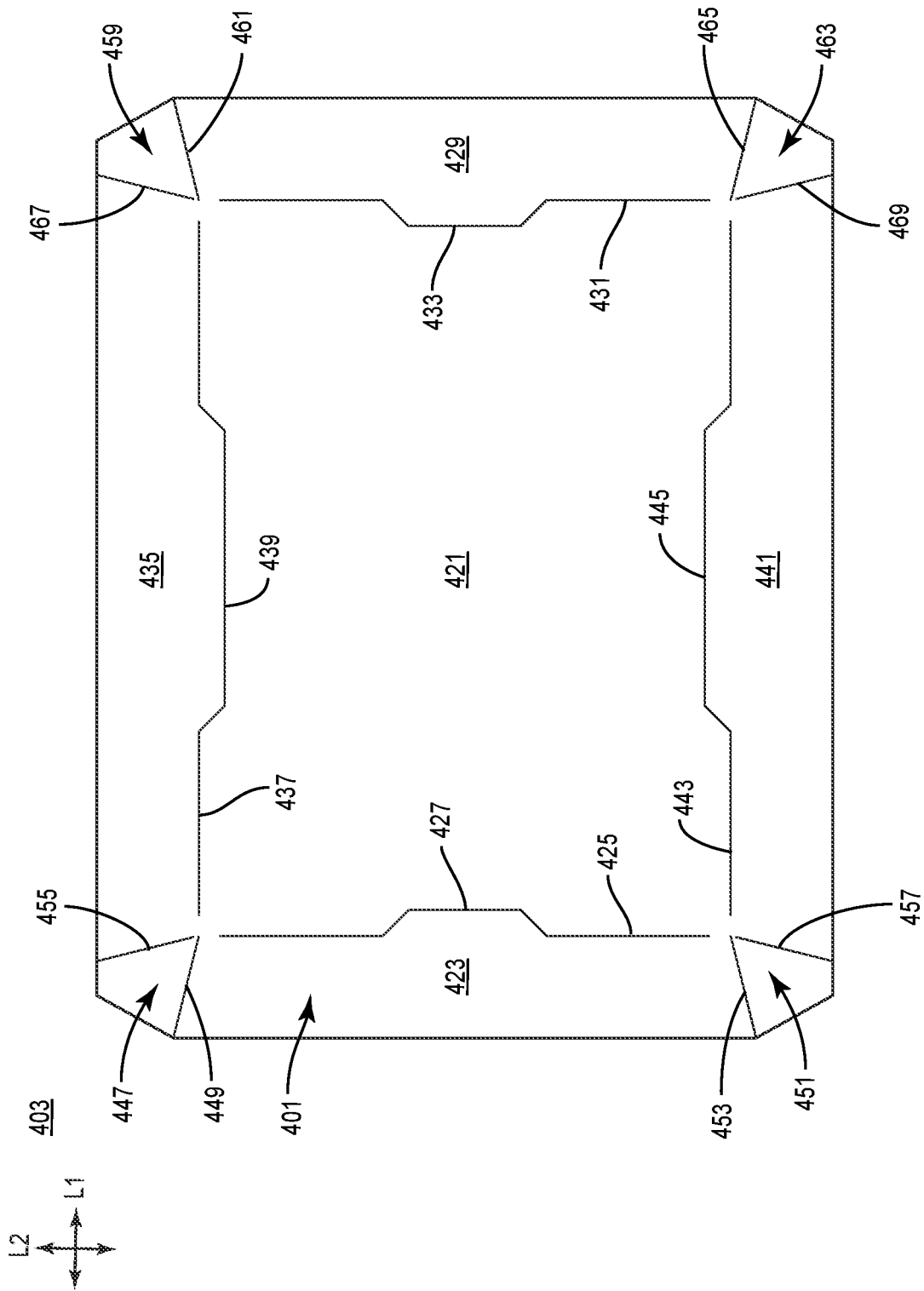
FIG. 10 is a plan schematic view of a blank for forming a construct according to a fourth exemplary embodiment of the disclosure.

Referring additionally to FIG. 10, an exterior surface 401 of a blank 403 for forming a construct 400 according to a fourth exemplary embodiment of the disclosure is illustrated. The blank 403 and the construct 400 can have one or more features that are the same or similar to those described above with regard to the blanks 103, 203, 303 and the constructs 100, 200, 300, and like or similar reference numbers are used to denote like or similar features.

The blank 403 has the longitudinal axis L1 and the lateral axis L2 and can be at least partially formed from the laminate structure 102, though the blank 403 can be formed from one or more additional or alternative materials without departing from the disclosure.

As shown, the blank 403 includes a main/central/base panel or base panel 421 foldably connected to a first end panel 423 at a lateral fold line 425 that can be interrupted by a cut 427 having one or more of straight, curved, and angled portions. Similarly, the base panel 421 can be foldably connected to a second side panel 429 at a lateral fold line 431 that can be interrupted by a cut 433 having one or more of straight, curved, and angled portions.

A first side panel 435 can be foldably connected to the base panel 421 at a longitudinal fold line 437 that is interrupted by a cut 439 having one or more straight, curved, and angled portions. Similarly, a second side panel 441 can be foldably connected to the base panel 421 at a longitudinal fold line 443 that is interrupted by a cut 445 having one or more of straight, curved, and angled portions.

A plurality of end flaps can be foldably connected to respective panels of the plurality of panels of the blank 403, and can include a first corner panel 447 foldably connected to the first end panel 423 at an oblique fold line 449, and a second corner panel 451 foldably connected to the first end panel 423 at an oblique fold line 453. As shown, the corner panels 447, 451 can be separated from the respective side panels 435, 441 at respective oblique cuts 455, 457.

Similarly, a first corner panel 459 can be foldably connected to the second end panel 429 at an oblique fold line 461, and a second corner panel 463 can be foldably connected to the second end panel 429 at an oblique fold line 465. The corner panels 459, 463 can be separated from the respective side panels 435, 441 at respective oblique cuts 467, 469.

Figure 11:
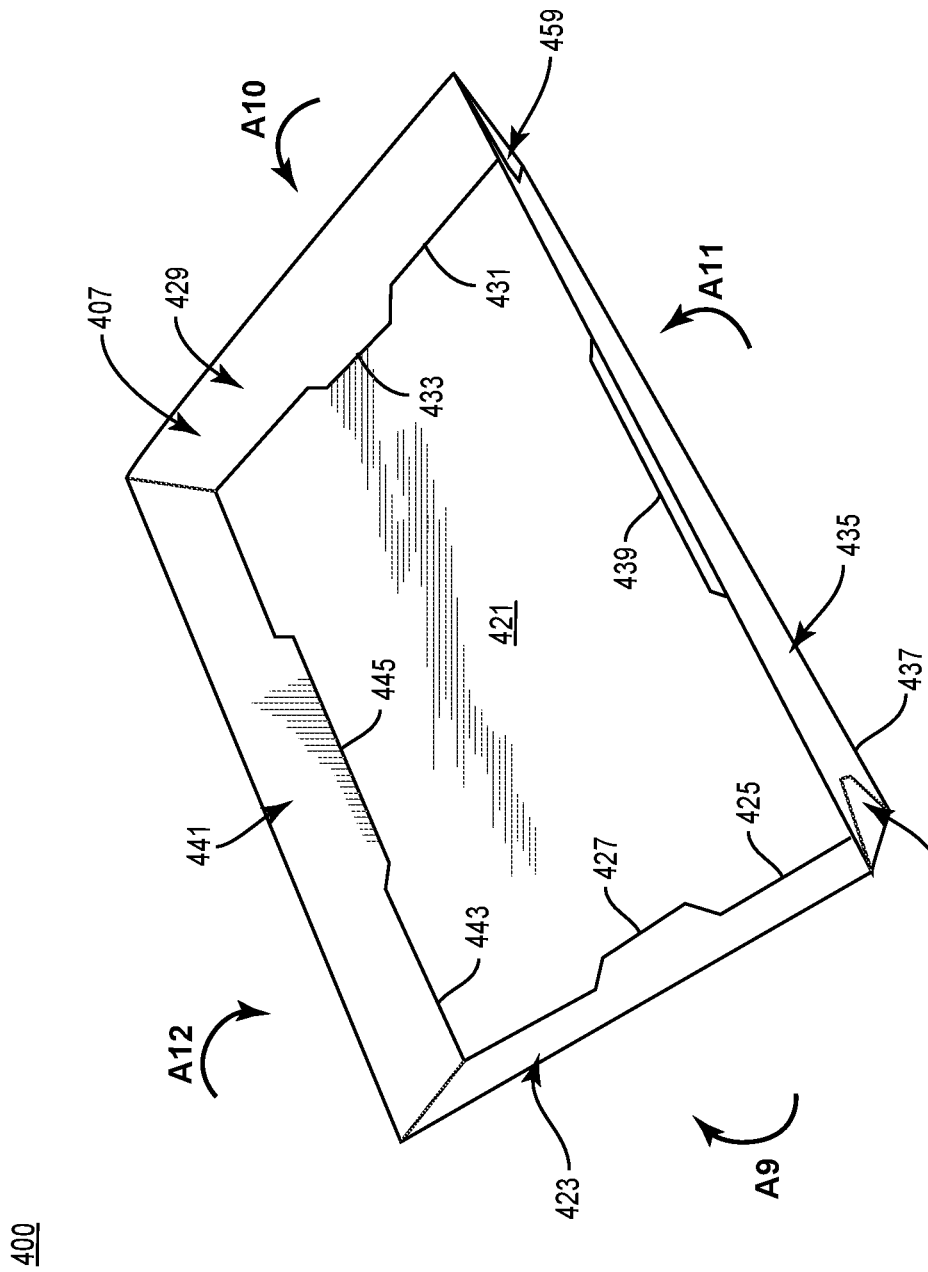
FIG. 11 is a perspective view of a construct formed from the blank of FIG. 10 according to the fourth exemplary embodiment of the disclosure.
Figure 12:
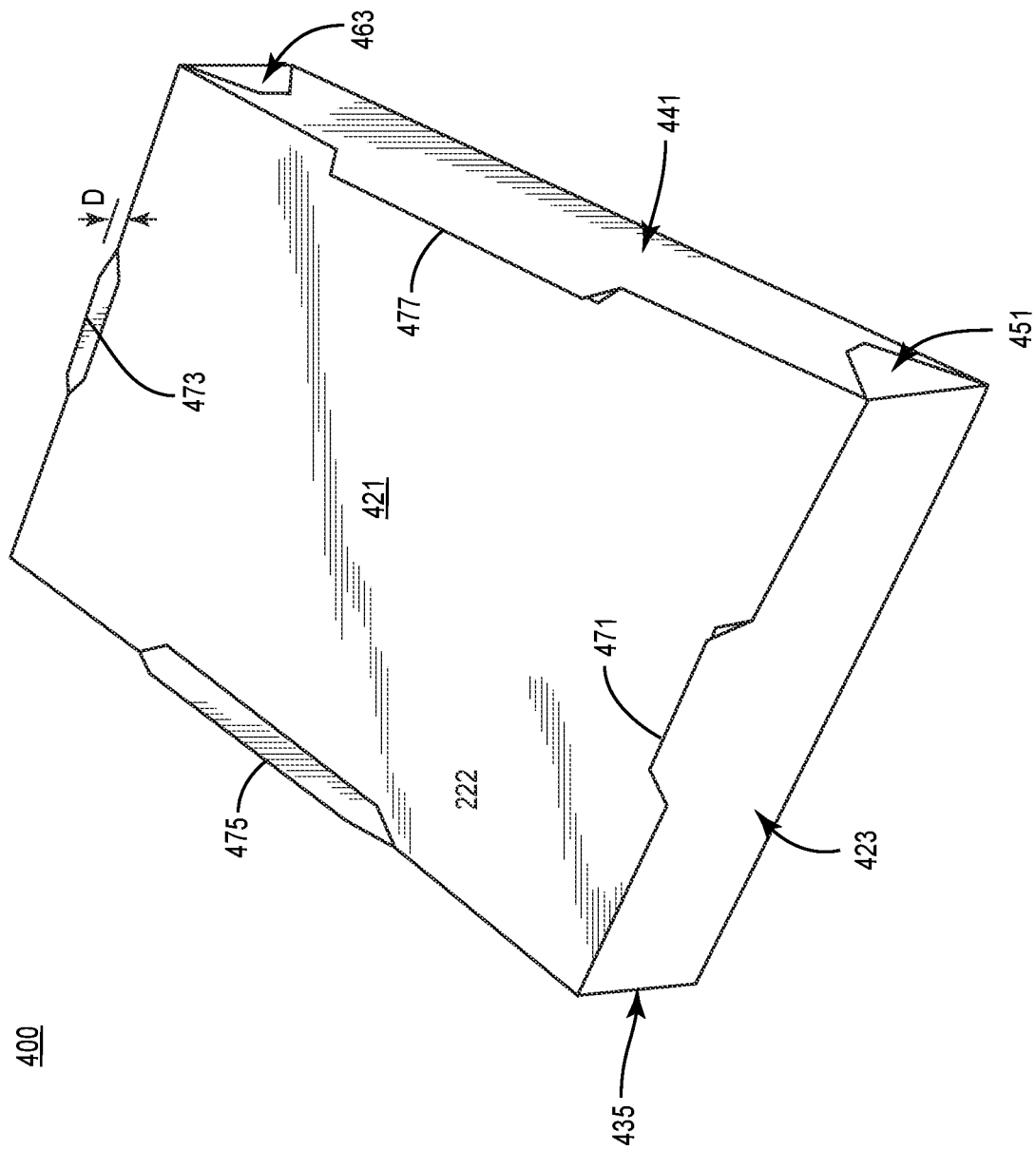
FIG. 12 is another perspective view of the construct of FIG. 11.

With additional reference to FIGS. 11 and 12, the construct 400 can be formed from the blank 403, in one exemplary embodiment, by placing the exterior surface 401 of the blank 403 facing downwardly on a supporting surface and folding the end panels 423, 429 upwardly at the respective fold lines 425, 421 in the direction of the respective arrows A9, A10, and, simultaneously or thereafter, folding the side panels 435, 441 upwardly at the respective fold lines 437, 443 in the direction of the respective arrows A11, A12.

The corner panels 447, 459 can be folded at the respective fold lines 449, 461 into at least partial face-to-face contact with the side panel 435, and the corner panels 451, 463 can be folded at the respective fold lines 453, 465 into at least partial face-to-face contact with the side panel 441. Such an arrangement of the construct 400 can be maintained with an adhesive such as glue.

Upon such formation of the construct 400, portions of the respective end panels 423, 429 and the respective side panels 435, 441 can separate from the adjacent base panel 421 at the respective cuts 427, 433, 439, 445 to form a plurality of respective spacing members 471, 473 (broadly, "second spacing members"), 475, 477 (broadly, "first spacing members") protruding downwardly from the respective panels 423, 429, 435, 441. In this regard, the spacing members 471, 473, 475, 477 can have the form of tabs, struts, legs, etc. that extend downwardly relative to the base panel 421. It will be understood that one or more of the spacing members 471, 473, 475, 477 can have a different configuration or arrangement without departing from the disclosure.

As shown, the construct 400 can have a generally tray-like arrangement, with the panels 421, 423, 429, 435, 441 extending at least partially around an interior 407 of the construct 400 for receiving one or more food products.

The construct 400 can thus be configured for being supported on an induction source, such as the induction source S in FIG. 5, that is configured to generate one or more oscillating/changing magnetic fields B such that, upon generation of one or more oscillating magnetic fields B by the induction source S, one or more electrical currents, e.g., Eddy currents, can form in the conductive material of the construct 400 to generate heat H through electrical resistance that can be conducted to a food product, for example, a food product F.

The spacing members 471, 473, 475, 477 of the construct 400 can be arranged to position the base panel 421 a preselected distance D above the induction source S to provide a desired attenuation of the heat H provided to food product F in response to the oscillating magnetic field B, for example, to prevent thermal damage (e.g., crazing, flaking, etc.) of one or more portions of the construct 400, to prevent charring or overcooking of the food product F, etc., as described above with regard to the constructs 100, 200, 300.

Figure 13:
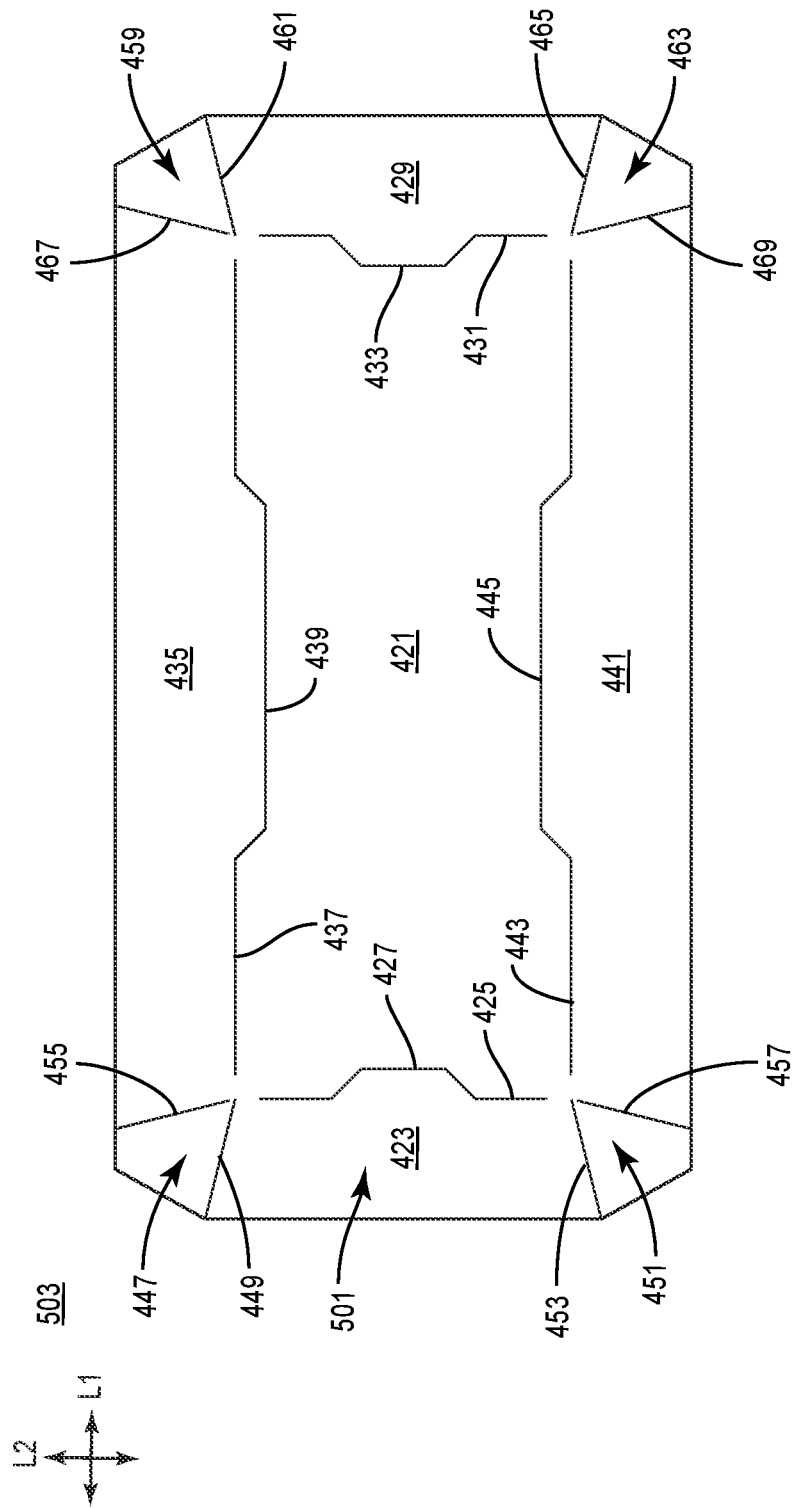
FIG. 13 is a plan schematic view of a blank for forming a construct according to a fifth exemplary embodiment of the disclosure.

Referring additionally to FIG. 13, an exterior surface 501 of a blank 503 for forming a construct 500 according to a fifth exemplary embodiment of the disclosure is illustrated. The blank 503 and the construct 500 can have one or more features that are the same or similar to those described above with regard to the blanks 103, 203, 303, 403 and the constructs 100, 200, 300, 403 and like or similar reference numbers are used to denote like or similar features.

In particular, the blank 503 can be generally similar to the blank 403, except that the panels 421, 423, 429, 435, 441 are provided in a different dimensioning/arrangement. In this regard, a construct formed from the blank 503 can be formed in a similar manner to that described above with regard to the formation of the construct 400 from the blank 403, and can be used to support the base panel 421 a preselected distance above an induction source as described above with regard to the foregoing embodiments.

It will be understood that additional or alternative constructs for induction heating of one or more food products can be provided without departing from the disclosure. Such constructs can have the form of bowls, trays, sleeves, mats, lidded structures (e.g., having one or more hingable lids), etc., and can have at least a bottom/base panel with one or more spacing members in the form of tabs, legs, struts, protuberances, other protrusions, etc., extending therefrom for supporting the bottom/base panel a predetermined distance from an induction source in accordance with the discussion above.

In general, the blanks or base layers described herein may be constructed from paperboard having a caliper so that it is heavier and more rigid than ordinary paper. The base layer can also be constructed of other materials, such as cardboard, or any other material having properties suitable for enabling the construct to function at least generally as described above. The base layer can be coated with, for example, a clay coating. The clay coating may then be printed over with product, advertising, and other information or images. The base layers may then be coated with a varnish to protect information printed on the base layers. The base layers may also be coated with, for example, a moisture barrier layer, on either or both sides of the base layers. The base layers can also be laminated to or coated with one or more sheet-like materials at selected panels or panel sections.

It will be apparent that numerous other sequences of steps may be used to form constructs as described herein. It also will be apparent that numerous other materials or structures may be used to form a construct in accordance with the disclosure. Any of such materials may be used alone or in combination, and in any configuration, to form the construct. Where multiple materials (or multiple layers of the same material) are used, the materials may be joined to one another partially or completely, or may remain separate from one another (i.e., unjoined).

Countless other structures and constructs are contemplated by the disclosure. If desired, any of such structures may include one or more areas that are devoid of conductive material or inhibited from thermal/electrical conduction. Such areas may be used to enhance heating, browning, and/or crisping of an adjacent food product or other item, and may be sized, positioned, and/or arranged to customize such heating.

Any of such structures or constructs may be formed from various materials, provided that the materials are substantially resistant to softening, scorching, combusting, or degrading at typical surface heating temperatures, for example, up to about 400° F., and, in one embodiment, up to about 425° F. Such heating temperatures can be higher without departing from the disclosure.

If desired, any of the numerous conductive materials described herein or contemplated hereby may be substantially continuous, that is, without substantial breaks or interruptions, or may be discontinuous, for example, by including one or more breaks or apertures. The breaks or apertures may be sized and positioned to heat particular areas of a food product or other item selectively. The breaks or apertures may extend through the entire structure, or only through one or more layers. The number, shape, size, and positioning of such breaks or apertures may vary for a particular application depending on the type of construct being formed, the food product or other item to be heated therein or thereon, the desired degree of shielding, browning, and/or crisping, the need for regulating the change in temperature of the food item through direct heating, and whether and to what extent there is a need for venting.

It will be understood that an aperture may be a physical aperture or void in one or more layers or materials used to form the construct, or may be a non-physical "aperture" (not shown), e.g., areas that may be formed by simply not applying conductive material to the particular area, or by removing conductive material in the particular area, e.g., mechanically, chemically, etc.

In some instances, it may be beneficial to create one or more discontinuities or inactive regions to prevent overheating or charring of the construct or one or more food products supported thereon. Such areas may be formed by forming these areas of the construct without a conductive material, by removing any conductive material that has been applied, or by deactivating the conductive material in these areas, as discussed above.

Conductive material described herein may be applied to a base layer or substrate in any suitable manner, and in some instances, the conductive material may be printed on, extruded onto, sputtered onto, evaporated on, or laminated to the substrate. The conductive material may be applied to the substrate in any pattern, and using any technique, to achieve the desired heating effect of the food item. For example, the conductive material may be provided as a continuous or discontinuous layer or coating including circles, loops, hexagons, islands, squares, rectangles, octagons, and so forth.

The laminate structures and blanks/constructs disclosed herein may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of a construct to be formed (e.g., a blank or base layer).

All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present disclosure, and do not create limitations, particularly as to the position, orientation, or use of the disclosed embodiments unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

The foregoing description illustrates and describes various embodiments of the disclosure. As various changes could be made in the above construction, it is intended that all matter contained in the above description or shown in the accompanying drawings shall be interpreted as illustrative and not in a limiting sense. Furthermore, various modifications, combinations, and alterations, etc., of the above-described embodiments are within the scope of the disclosure. Additionally, the disclosure shows and describes only selected embodiments, but various other combinations, modifications, and environments are within the scope of the disclosure, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. A construct, the construct comprising:
a base panel and at least one end flap foldably connected to the base panel, the base panel formed from a laminate structure comprising a base layer, a conductive layer, and a surface film, the base panel in a planar arrangement for supporting a food product, the at least one end flap comprises a proximal portion foldably connected to the base panel at a fold line and a distal portion foldably connected to the proximal portion at a fold line wherein the base panel further comprises at least two cuts at least partially forming at least two retention tabs, the distal portion of the at least one end flap at least partially received between each of the at least two retention tabs and the base panel; and
at least one spacing feature extending downwardly from the base panel for supporting the base panel a distance above an induction source for attenuating heat transferred to the food product in response to an oscillating magnetic field interacting with the conductive layer of the laminate structure, the proximal portion extending downwardly from the fold line at which the proximal portion is foldably connected to the base panel, and the distal portion extending to the base panel upwardly from the fold line at which the distal portion is foldably connected to the proximal portion such that the proximal portion and the distal portion form an oblique or wedge-shaped profile of the at least one spacing feature.

2. The construct of claim 1, wherein the base layer comprises a composite material, the conductive layer comprises a metallic material, and the surface film comprises a polymeric material.

3. The construct of claim 2, wherein the base layer comprises paperboard and the metallic material comprises aluminum.

4. The construct of claim 1, wherein the at least one spacing feature is a first spacing feature, the at least one end flap is a first end flap, the construct further comprising a second end flap foldably connected to the base panel and a second spacing feature extending downwardly from the base panel and comprising the second end flap.

5. A blank for forming a construct, the blank comprising:
a base panel and at least one end flap foldably connected to the base panel, the base panel formed from a laminate structure comprising a base layer, a conductive layer, and a surface film, the base panel in a planar arrangement for supporting a food product, the at least one end flap comprises a proximal portion foldably connected to the base panel at a fold line and a distal portion foldably connected to the proximal portion at a fold line, wherein the base panel further comprises at least two cuts at least partially forming at least two retention tabs, the distal portion of the at least one end flap at least partially received between each of the at least two retention tabs and the base panel when the construct is formed from the blank; and
features for forming at least one spacing feature extending downwardly from the base panel for supporting the base panel a distance above an induction source for attenuating heat transferred to the food product in response to an oscillating magnetic field interacting with the conductive layer of the laminate structure when the construct is formed from the blank, the proximal portion for extending downwardly from the fold line at which the proximal portion is foldably connected to the base panel when the construct is formed from the blank, and the distal portion for extending to the base panel upwardly from the fold line at which the distal portion is foldably connected to the proximal portion such that the proximal portion and the distal portion are configured to form an oblique or wedge-shaped profile of the at least one spacing feature when the construct is formed from the blank.

6. The blank of claim 5, wherein the base layer comprises a composite material, the conductive layer comprises a metallic material, and the surface film comprises a polymeric material.

7. The blank of claim 6, wherein the base layer comprises paperboard and the metallic material comprises aluminum.

8. The blank of claim 5, wherein the at least one spacing feature is a first spacing feature, the at least one end flap is a first end flap, the blank further comprises a second end flap foldably connected to the base panel for at least partially forming a second spacing feature for protruding downwardly from the base panel when the construct is formed from the blank.

9. A method of forming a construct, the method comprising:
obtaining a blank comprising a base panel and at least one end flap foldably connected to the base panel, the base panel formed from a laminate structure comprising a base layer, a conductive layer, and a surface film, the base panel in a planar arrangement, the at least one end flap comprises a proximal portion foldably connected to the base panel at a fold line and a distal portion foldably connected to the proximal portion at a fold line wherein the base panel further comprises at least two cuts at least partially forming at least two retention tabs; and
forming at least one spacing feature extending downwardly from the base panel to support the base panel a preselected distance above an induction source for attenuating heat transferred to a food product in response to an oscillating magnetic field interacting with the conductive layer of the laminate structure, the forming the least one spacing feature comprising arranging the proximal portion extending downwardly from the fold line at which the proximal portion is foldably connected to the base panel, and arranging the distal portion extending to the base panel upwardly from the fold line at which the distal portion is foldably connected to the proximal portion such that the proximal portion and the distal portion form an oblique or wedge-shaped profile of the at least one spacing feature wherein the distal portion is at least partially received between each of the at least two retention tabs and the base panel.

10. The method of claim 9, wherein the base layer comprises a composite material, the conductive layer comprises a metallic material, and the surface film comprises a polymeric material.

11. The method of claim 10, wherein the base layer comprises paperboard and the metallic material comprises aluminum.

12. The method of claim 9, wherein the at least one spacing feature is a first spacing feature, the at least one end flap is a first end flap, the blank further comprises a second end flap foldably connected to the base panel, and the method further comprises arranging the second end flap forming a second spacing feature extending downwardly from the base panel.

13. A method of heating a food product using a construct, the method comprising:
obtaining a blank comprising a base panel and at least one end flap foldably connected to the base panel, the base panel formed from a laminate structure comprising a base layer, a conductive layer, and a surface film, the base panel in a planar arrangement, the at least one end flap comprising a proximal portion foldably connected to the base panel at a fold line and a distal portion foldably connected to the proximal portion at a fold line, wherein the base panel further comprises at least two cuts at least partially forming at least two retention tabs;

forming at least one spacing feature extending downwardly from the base panel comprising
arranging the proximal portion extending downwardly from the fold line at which the proximal portion is foldably connected to the base panel, and
arranging the distal portion extending to the base panel upwardly from the fold line at which the distal portion is foldably connected to the proximal portion such that the proximal portion and the distal portion form an oblique or wedge-shaped profile of the at least one spacing feature, wherein the distal portion is at least partially received between each of the at least two retention tabs and the base panel, thereby defining the construct;

positioning the construct on an induction source with the at least one spacing feature supporting the base panel a distance above the induction source; and activating the induction source to produce an oscillating magnetic field interacting with the conductive layer of the laminate structure to heat at least one food product supported on the base panel.

14. The method of claim 13, wherein the base layer comprises a composite material, the conductive layer comprises a metallic material, and the surface film comprises a polymeric material.

15. The method of claim 14, wherein the base layer comprises paperboard and the metallic material comprises aluminum.

16. The method of claim 13, wherein the at least one spacing feature is a first spacing feature, the at least one end flap is a first end flap, the blank further comprises a second end flap, and the method further comprises arranging the second end flap to at least partially form a second spacing feature protruding downwardly from the base panel.

17. A construct, the construct comprising:
a plurality of panels extending at least partially around an interior of the construct, the plurality of panels comprising a base panel, a first side panel foldably connected to the base panel, a second side panel foldably connected to the base panel, a first top panel foldably connected to the first side panel, and a second top panel foldably connected to the second side panel, the base panel formed from a laminate structure comprising a base layer, a conductive layer, and a surface film, the base panel in a planar arrangement for supporting a food product; and
a first spacing feature integral with the first side panel and extending upwardly from the first top panel, a second spacing feature integral with the second side panel and extending upwardly from the second top panel,
a third spacing feature integral with the first side panel and extending downwardly from the base panel, and a fourth spacing feature integral with the second side panel and extending downwardly from the base panel, the third and fourth spacing features for supporting the base panel a distance above an induction source for attenuating heat transferred to the food product in response to an oscillating magnetic field interacting with the conductive layer of the laminate structure.

18. The construct of claim 17, wherein the first top panel and the second top panel are attached to one another.

19. A blank for forming a construct, the blank comprising:
a plurality of panels for extending at least partially around an interior of the construct formed from the blank, the plurality of panels comprising a base panel, a first side panel foldably connected to the base panel, a second side panel foldably connected to the base panel, a first top panel foldably connected to the first side panel, and a second top panel foldably connected to the second side panel, the base panel formed from a laminate structure comprising a base layer, a conductive layer, and a surface film, the base panel in a planar arrangement for supporting a food product; and
a first spacing feature integral with the first side panel and configured to extend upwardly from the first top panel, a second spacing feature integral with the second side panel and configured to extend upwardly from the second top panel,
a third spacing feature integral with the first side panel and configured to extend downwardly from the base panel, and a fourth spacing feature integral with the second side panel and configured to extend downwardly from the base panel, the third and fourth spacing features for supporting the base panel a distance above an induction source for attenuating heat transferred to the food product in response to an oscillating magnetic field interacting with the conductive layer of the laminate structure when the construct is formed from the blank.

20. The blank of claim 19, wherein the first top panel and the second top panel are for being attached to one another when the construct is formed from the blank.

21. A method of forming a construct, the method comprising:
  obtaining a blank comprising a plurality of panels for extending at least partially around an interior of the construct, the plurality of panels comprising a base panel, a first side panel foldably connected to the base panel, a second side panel foldably connected to the base panel, a first top panel foldably connected to the first side panel, and a second top panel foldably connected to the second side panel, the base panel formed from a laminate structure comprising a base layer, a conductive layer, and a surface film, the base panel in a planar arrangement;
  folding the plurality of panels to define the interior of the construct, wherein said folding includes
    forming a first spacing feature integral with the first side panel and extending upwardly from the first top panel and a second spacing feature integral with the second side panel and extending upwardly from the second top panel, and
    forming a third spacing feature integral with the first side panel and extending downwardly from the base panel and a fourth spacing feature integral with the second side panel and extending downwardly from the base panel, the third and fourth spacing features for supporting the base panel a preselected distance above an induction source for attenuating heat transferred to a food product in response to an oscillating magnetic field interacting with the conductive layer of the laminate structure.

22. The method of claim 21, further comprising attaching the first top panel to the second top panel.

23. A method of heating a food product using a construct, the method comprising:
  obtaining a blank comprising a plurality of panels for extending at least partially around an interior of the construct, the plurality of panels comprising a base panel, a first side panel foldably connected to the base panel, a second side panel foldably connected to the base panel, a first top panel foldably connected to the first side panel, and a second top panel foldably connected to the second side panel, the base panel formed from a laminate structure comprising a base layer, a conductive layer, and a surface film, the base panel in a planar arrangement;
  folding the plurality of panels to define the interior of the construct, wherein said folding includes
    forming a first spacing feature integral with the first side panel and extending upwardly from the first top panel and a second spacing feature integral with the second side panel and extending upwardly from the second top panel, and
    forming a third spacing feature integral with the first side panel and extending downwardly from the base panel and a fourth spacing feature integral with the second side panel and extending downwardly from the base panel, thereby defining the construct;
  positioning the construct on an induction source with the third and fourth spacing features supporting the base panel a distance above the induction source; and
  activating the induction source to produce an oscillating magnetic field interacting with the conductive layer of the laminate structure to heat at least one food product supported on the base panel.

24. The method of claim 23, further comprising attaching the first top panel to the second top panel.

* * * * *